S. DAVIES.
HAND SOLDERING TOOL.
APPLICATION FILED JULY 5, 1919.
1,341,497.
Patented May 25, 1920.
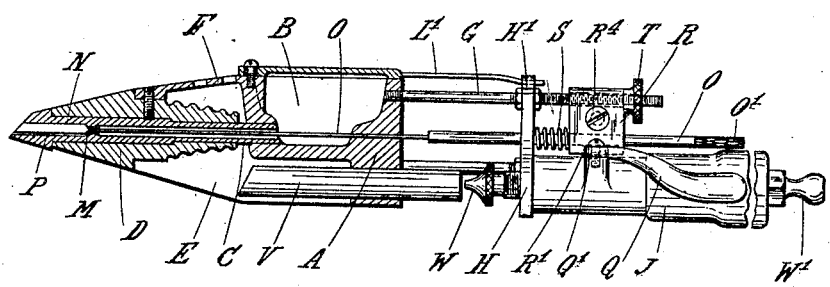
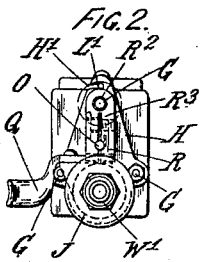
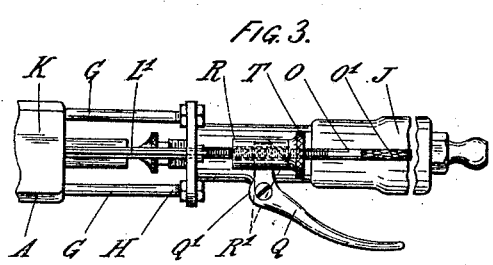
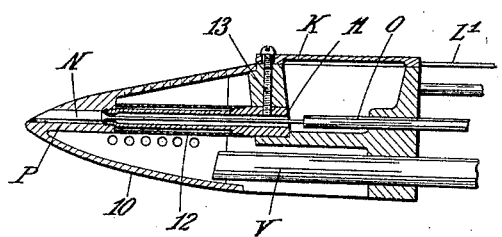
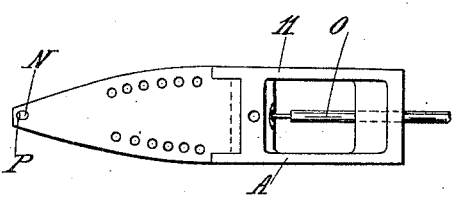

UNITED STATES PATENT OFFICE.

SAMUEL DAVIES, OF ELTHAM, ENGLAND.

HAND SOLDERING-TOOL.

1,341,497. Specification of Letters Patent. Patented May 25, 1920.

Application filed July 5, 1919. Serial No. 308,761.

*To all whom it may concern:*

Be it known that I, SAMUEL DAVIES, a subject of the King of Great Britain, and resident of Eltham, England, have invented new and useful Improvements in Hand Soldering-Tools, of which the following is a specification.

This invention relates to an improved hand soldering tool of the kind having a reservoir for receiving solid solder and means for fusing the solder and heating the bit.

According to my invention, the inner chamber or compartment which receives the fused solder is furnished with a valve rod passing through said chamber and extending to the nose of the bit, the valve for controlling the flow of the solder being formed at an intermediate point on the rod, and the extension of the rod beyond the valve being channeled to provide a passage for the solder. The said inner chamber may be conveniently formed by a tube which also serves to unite the reservoir body to the bit. The outer chamber or reservoir is provided with a cover or lid which seals it externally and so enables the tool to be turned over without spilling the solder.

The heating of the solder and bit is effected by gas, electricity, charcoal or anthracite.

The heated parts of the tool are connected to the handle by means of a cage or series of rods which do not allow of the transmission of heat in any considerable amount to the handle and thus insure the latter remaining cool.

My invention is illustrated in the accompanying drawings, in which:

Figure 1 is a partial side elevation and partial central longitudinal section of the soldering tool having a copper bit.

Fig. 2 is an end elevation of the same, and

Fig. 3 is a plan of a portion of the tool.

Fig. 4 is a longitudinal section, and

Fig. 5 is a plan with the lid removed illustrating a portion of a modified tool having a steel bit.

Referring to Figs. 1 to 3: A is the reservoir body provided with a chamber B to receive the solder and having fixed therein a steel tube C which constitutes the outlet for the melted solder. The front end of the tube C is secured in a longitudinal hole in the copper bit D which is secured to lateral extensions E of the reservoir body. The reservoir body also has a projecting perforated upper part F serving with the sides E to form a heating chamber in which a gas flame burns as hereinafter described. The rear end of the reservoir body is connected by three parallel rods G, G to a frame plate H to which the handle J is secured so as to form a cakelike connection which is strong enough to support the weight of the reservoir and bit, and which has a large radiating surface in comparison to the cross-sectional area of its members, thus reducing to a minimum the transmission of heat to the handle.

The reservoir chamber B is furnished with a lid K which is made to swivel laterally about a pivot pin L and is moved to open and close the reservoir by means of a spring arm L' which is adapted to hook into a catch or notch H' in the frame plate H when the lid is closed. I find that this arrangement is very easy to operate, and gives a good closure of the solder-reservoir.

The tube C is provided near its forward end with a seating M for a valve N formed on a valve-rod O. The valve extends to the extreme end of the bit and has an easy fit in the longitudinal hole in the bit. The underside of the valve is flattened or grooved so as to leave a channel P in the lower part of the longitudinal hole, through which channel the melted solder can pass out on to the nose of the bit when the valve is opened. The valve-rod has a smaller diameter than the bore of the tube C and passes through said tube and the solder-reservoir and through a bearing in the frame plate H.

For actuating the valve I employ a bell-crank lever Q pivoted to the handle J at Q', the short arm of the lever engaging in a slot R' formed in a block R which is secured on the valve rod. Between this block and the frame plate H is a spring S tending to press the valve N against its seat M. The block R has a clearance hole at $R^2$ in order that it may slide freely on the screw-threaded rearward extension of one of the rods G which connect the handle to the reservoir body. T is a nut on the said rearward extension of the rod G forming an abutment for the block R. Said block R is further split at $R^3$ and is furnished with a screw $R^4$ by which the split part of the block can be closed up to clamp the block tight on to the valve rod O. To regulate the flow of solder, the adjusting nut T is moved forward or backward thereby adjusting the position of the valve N as may be required. Should it be required to increase the flow of solder momentarily this is done by pressing on the thumb lever Q. The rear end of the valve rod O is shown knurled at O' to facilitate pushing the valve forward out of the nose of the bit for cleaning purposes. Before this can be done the clamping screw R⁴ must be slacked back.

V is a Bunsen burner tube mounted in the lower part of the tool and opening at its front end into the heating chamber between the bit and the reservoir-body and having its rear end opposite a gas-nozzle or injector W mounted in the handle J and adapted to receive a flexible gas-supply pipe at its rear projecting end W'. If solid fuel is to be used for heating purposes, the burner tube V is removed, and the fuel is placed in the lower part of the body A which in that case is closed at the bottom, a door being provided at the side for admitting the fuel.

In some cases I provide the solderer with a bit made of steel or steel alloy as shown in Figs. 4 and 5.

The bit is shown at 10, and in this case the tube 11 which conveys the melted solder to the nose of the bit, is screwed into the bit at its forward end. 12 is a thin steel sleeve surrounding the tube 11. The screw 13 serves to secure the bit to the reservoir-body, and also forms the center about which the swivel lid turns. In other respects the construction is the same as shown in Figs. 1 to 3.

What I claim is:

1. A hand soldering tool comprising a bit, a solder-reservoir arranged adjacent to said bit and provided with an inlet-opening for solder, a detachable lid to said inlet-opening, a tubular channel extending through said bit and communicating at one end with said solder-reservoir and at the other end with a passage extending to the exterior of the bit, a valve-rod extending through said channel and through said reservoir, a valve on said valve-rod controlling the communication between said passage and said channel, means for heating said bit, a handle, a plate on said handle, and a plurality of rods connecting said plate and said solder reservoir.

2. In a hand soldering tool, a frame, a reservoir for receiving solder, means for fusing the solder and heating the bit, a swivel lid to said reservoir, an actuating arm on said lid, a catch on the frame to engage said arm, a tubular channel for receiving the melted solder, a valve-rod extending through said channel to the nose of the bit, and a valve formed at an intermediate point on the valve-rod, said valve being longitudinally channeled to provide a passage for the solder.

3. A hand soldering tool comprising a bit, a solder-reservoir arranged adjacent to said bit and provided with an inlet-opening for solder, a detachable lid to said inlet-opening, a tubular channel extending through said bit and communicating at one end with said solder-reservoir and at the other end with a passage extending to the exterior of the bit, a valve-rod extending through said channel and through said reservoir, a valve on the valve-rod controlling the communication between said passage and said channel, means for heating said bit, a handle, a plate on said handle, a plurality of rods connecting said plate and said solder-reservoir, an abutment adjustably mounted on said valve-rod, a spring acting between said abutment and said plate, an adjustable stop for limiting the movement of said abutment, and a lever pivotally mounted on the handle and engaging said abutment.

SAMUEL DAVIES.

Witnesses:
GEORGE HARRISON,
CONRAD ARNOLD.